US012580862B1

(12) United States Patent
Moran et al.

(10) Patent No.: US 12,580,862 B1
(45) Date of Patent: Mar. 17, 2026

(54) LARGE SCALE NETWORK-ON-CHIP (NOC) CONGESTION AWARE ROUTING

(71) Applicant: XSIGHT LABS LTD., Kiryat Gat (IL)

(72) Inventors: Gil Moran, Kiryat Gat (IL); Guy Koren, Rishon Lezion (IL); Gal Malach, Gedera (IL); Asaf Shoham, Yerucham (IL); Yossi Eini, Ashdod (IL); Boaz Kfir, Meitar (IL)

(73) Assignee: XSIGHT LABS LTD., Kiryat Gan, IL (US)

( * ) Notice: Subject to any disclaimer, the term of this patent is extended or adjusted under 35 U.S.C. 154(b) by 491 days.

(21) Appl. No.: 18/167,046

(22) Filed: Feb. 9, 2023

Related U.S. Application Data

(63) Continuation-in-part of application No. 17/444,473, filed on Aug. 4, 2021, now Pat. No. 12,143,302.

(60) Provisional application No. 63/267,787, filed on Feb. 9, 2022, provisional application No. 63/198,170, filed on Oct. 1, 2020, provisional application No. 62/706,294, filed on Aug. 7, 2020.

(51) Int. Cl.
| | |
|---|---|
| *H04L 47/125* | (2022.01) |
| *H04L 45/02* | (2022.01) |
| *H04L 47/24* | (2022.01) |

(52) U.S. Cl.
CPC ............ *H04L 47/125* (2013.01); *H04L 45/04* (2013.01); *H04L 47/24* (2013.01)

(58) Field of Classification Search
CPC ........ H04L 47/125; H04L 45/04; H04L 47/24
USPC ........................................................ 370/252
See application file for complete search history.

(56) References Cited

U.S. PATENT DOCUMENTS

| | | | |
|---|---|---|---|
| 8,155,113 B1 | 4/2012 | Agarwal | |
| 8,572,353 B1 * | 10/2013 | Bratt ................... | G06F 12/1027 |
| | | | 712/16 |
| 10,511,523 B1 | 12/2019 | Bosshart et al. | |
| 10,721,167 B1 | 7/2020 | Bosshart et al. | |
| 11,424,983 B2 | 8/2022 | Chang | |
| 2010/0191911 A1 | 7/2010 | Heddes et al. | |
| 2011/0087820 A1 | 4/2011 | Norden | |
| 2013/0051385 A1 | 2/2013 | Jayasimha et al. | |
| 2013/0250792 A1 | 9/2013 | Yoshida et al. | |
| 2014/0019512 A1 | 1/2014 | Ajima et al. | |
| 2014/0211622 A1 * | 7/2014 | Kumar ................... | H04L 47/70 |
| | | | 370/235 |
| 2014/0328172 A1 * | 11/2014 | Kumar ................... | H04L 47/18 |
| | | | 370/231 |
| 2014/0376557 A1 | 12/2014 | Park et al. | |
| 2015/0188847 A1 * | 7/2015 | Chopra ................. | H04L 45/306 |
| | | | 370/401 |

(Continued)

*Primary Examiner* — Kwang B Yao
*Assistant Examiner* — Syed M Bokhari
(74) *Attorney, Agent, or Firm* — Reches Patents

(57) ABSTRACT

A method for traffic control in a network on chip that includes a group of routers and a group of processing engines (PEs). The method includes (i) obtaining, by a source PE that is coupled to a sub-group of routers via a sub-group of channels, backpressure information related to sub-group of channels; (ii) selecting, by the source PE, a selected channel of the sub-group of channels for conveying a packet destined to reach a destination PE; wherein the selecting is based, at least in part, on the backpressure information; wherein the source PE and the destination PE belong to the group of PEs; wherein the sub-group of routers belong to the group of routers; and (iii) outputting the packet to the selected channel.

25 Claims, 5 Drawing Sheets

(56)     References Cited

U.S. PATENT DOCUMENTS

| | | | |
|---|---|---|---|
| 2015/0254104 A1 | 9/2015 | Kessler et al. | |
| 2016/0149780 A1 | 5/2016 | Hsu et al. | |
| 2017/0272381 A1* | 9/2017 | Li | H04L 49/15 |
| 2019/0238665 A1 | 8/2019 | Bosshart et al. | |
| 2020/0153757 A1* | 5/2020 | Bharadwaj | H04L 45/58 |
| 2020/0356522 A1* | 11/2020 | Orthner | H04L 49/351 |
| 2021/0152469 A1 | 5/2021 | Bharadwaj | |
| 2021/0194800 A1 | 6/2021 | Bosshart | |
| 2022/0091754 A1 | 3/2022 | Raman et al. | |

* cited by examiner

PE 73    74

PE 73

PE 73

PE 73

74

R 72

R 72

R 72

R-C1
72-1

PE 73

PE 73

PE 73

PE 73

R 72

R 72

R 72

R-2C
72-2

PE 73

PE 73

PE 73

PE 73

R 72

R 72

R 72

RC-3
72-3

PE 73

PE-S 73-S

PE 73

PE 73

R 72

R-S
72-S

R 72

RC-4
72-4

71

70

TC-1
82-1

TC-2
82-2

TC-3
82-3

TC-4
82-4

Destination
selection 77-S

PE-S 73-S

Figure 4:
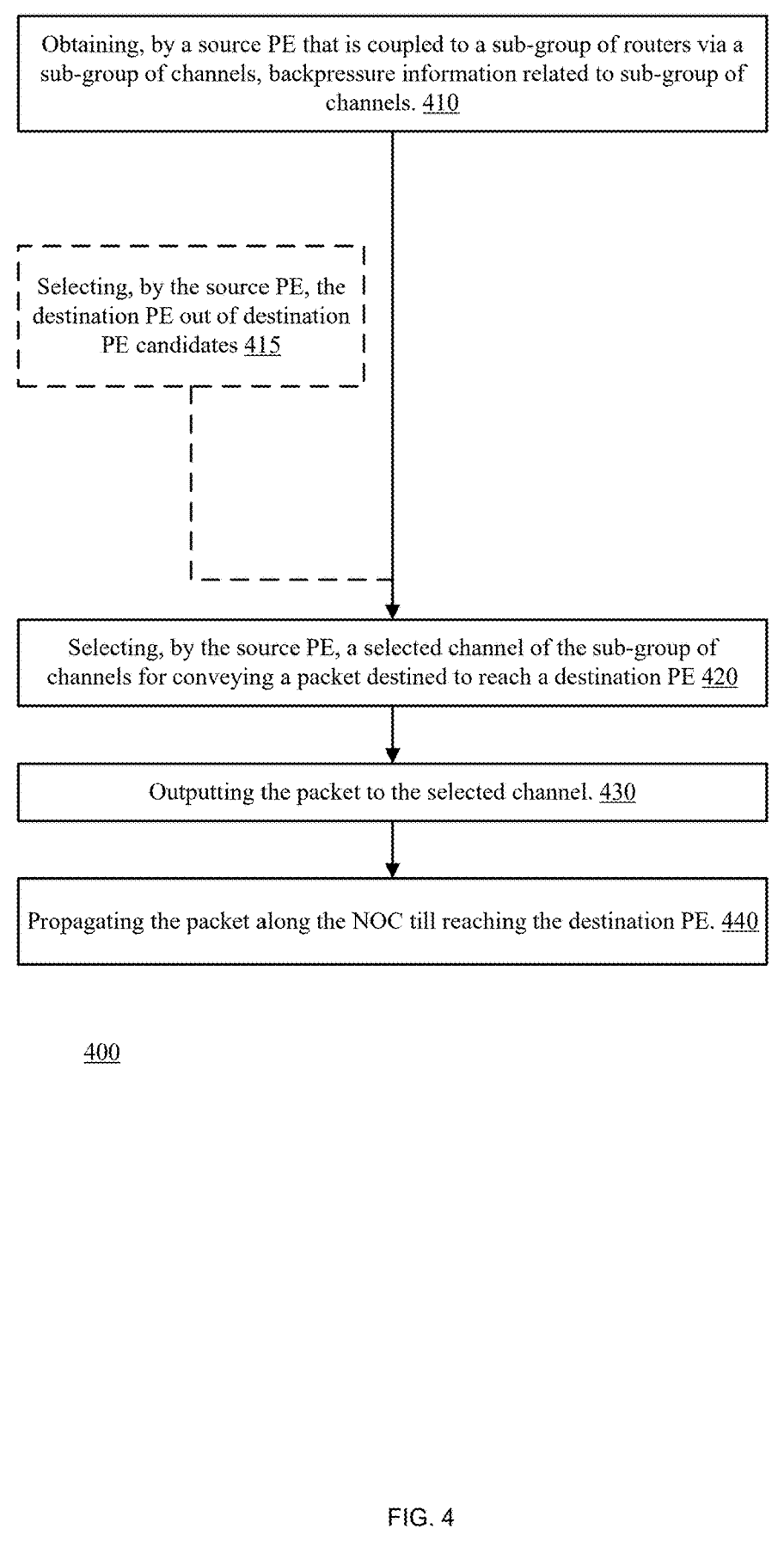

Obtaining, by a source PE that is coupled to a sub-group of routers via a sub-group of channels, backpressure information related to sub-group of channels. 410

Selecting, by the source PE, the destination PE out of destination PE candidates 415

Selecting, by the source PE, a selected channel of the sub-group of channels for conveying a packet destined to reach a destination PE 420

Outputting the packet to the selected channel. 430

Propagating the packet along the NOC till reaching the destination PE. 440

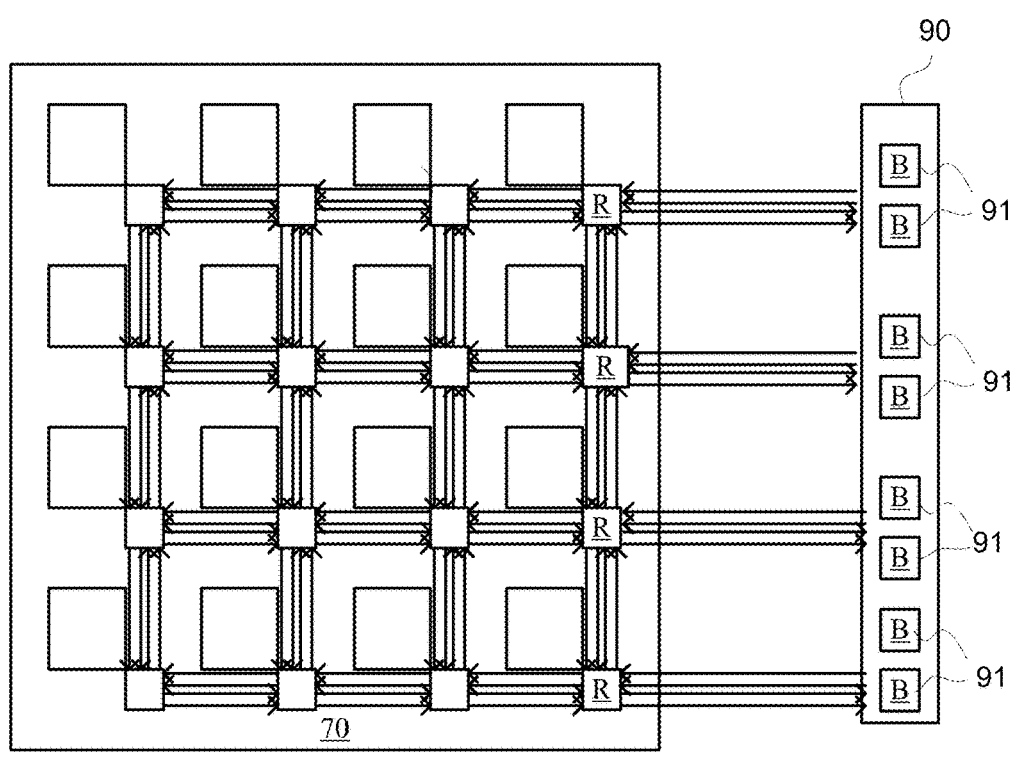
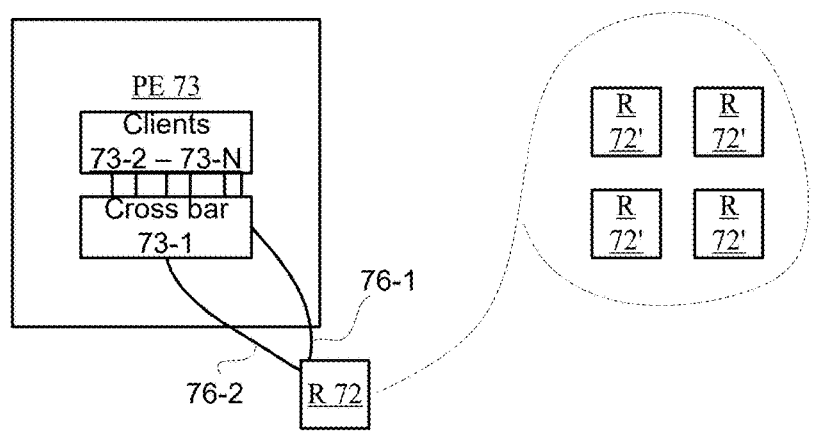
FIG. 5

LARGE SCALE NETWORK-ON-CHIP (NOC) CONGESTION AWARE ROUTING

CROSS REFERENCE

This application claims priority from U.S. provisional patent Ser. No. 63/267,787 filing date Feb. 9 2022 which is incorporated herein by reference.

This application is a continuation in part of U.S. patent application Ser. No. 17/444,473 which claims priority from U.S. provisional patent Ser. No. 62/706,294 and from U.S. provisional patent Ser. No. 63/198,170—both patent application are incorporated herein by reference.

BACKGROUND

NOC is common solution in use today in large scale system on chip (SOC) for internal connectivity between multiple Processing Elements. There are numerus publications related to NOC theory, modeling, implementation, and experiments showing different methods to achieve required performance.

NOC implementation requires sophisticate design to meet bandwidth and performance targets considering cost (area), power, latency and so on. Area as critical cost factor, limits the number of physical channels and the buffer depth in each NOC router. As a result, multiple transactions and transaction types are forced to use the same physical channel.

NOC transactions are injected from a source PE to a source NOC router, from there the transaction progress from one NOC router to another NOC router till it reach its destination NOC router. In the destination NOC router it is delivered from the destination NOC router to a destination PE.

NOC congestion is case were the transaction injection rate from PEs to the NOC is higher than the emitting rate from NOC to an associated PE.

NOC hotspot is case were multiple transactions from multiple PEs target the same destination PE, this cause congestion toward the destination PE.

NOC hot spot and congestion significantly reduce the NOC performance. Congestion and hotspot cause higher transaction latency and lower BW across the NOC.

Avoiding NOC hotspot and NOC congestion is important component to achieve sustained NOC bandwidth (BW), performance and latency.

NOC utilization and BW are critical resources, upon congestion or hotspot event, multiple PEs across the SOC may reduce utilization due to limited available NOC BW or due to the increased latency. Non active PE time means lower device performance.

There is a need to reduce the occurrence and impact of hotspot and congestion and to maintain NOC high BW and low latency and SOC utilization is high.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 illustrates an example of a method; and

FIG. 5 illustrates an example of an integrated circuit, a NOC, a processing elements, and a target located outside the NOC.

DETAILED DESCRIPTION OF THE DRAWINGS

Figure 1:
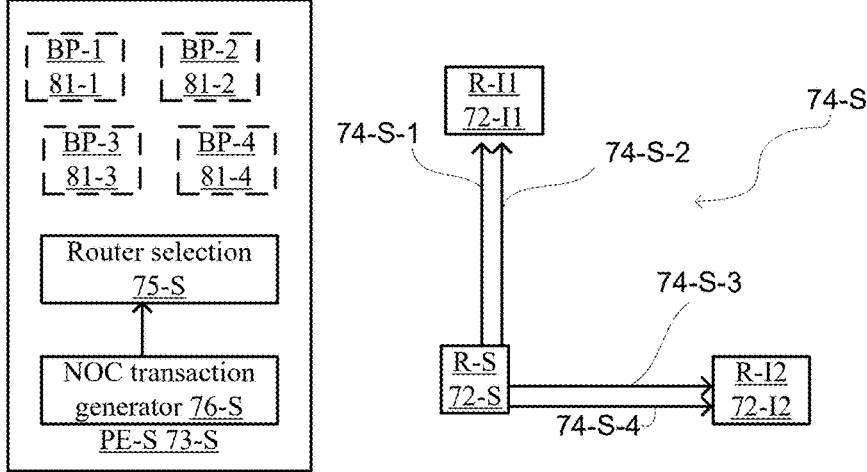
FIG. 1 illustrates an example of an integrated circuit, a NOC, a source processing engine, a destination processing engine, a source router and a sub-group of routers, and also illustrates minimal distance routes between the source router to the destination router, and multiple valid minimal paths.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

A processing engine is a hardware element that may have processing and communication capabilities. The processing engine may be a part of an integrated circuit, the integrated circuit may be a implemented as an application-specific integrated circuits (ASICs), field programmable gate arrays (FPGAs), full-custom integrated circuit, and the like. The processing engine may include a communication unit, a processing unit, memory and the like.

Various example illustrate a NOC that include 4 by 4 PEs and 4 by 4 routers. There may be any number of PEs and any number of routers.

It should be noted that the value of the suggested solution may increase when being used on NOCS of larger dimensions—for example 16×16 PEs and more, and where the mesh traffic congestion have major impact, and where multiple physical channels are duplicated in each routing direction to aggregate sufficient for the application needs.

There is provided an integrated circuit and a method that may include:

a. Congestion prediction and identification by measuring Physical Channel (PC) utilization and backpressure
        i. At injection PE (source PE)
        ii. At destination PE
    b. Identifying congestion or congestion buildup.
        i. Load reduction toward congested PC and PEs.
        ii. New transaction injection to less loaded PC.
        New transaction injection to less loaded direction.
        Ongoing transactions steering away from congestion.
        Delay injection toward congested PEs.

For effective implementation the NOC may use a minimal path route with restricted turns to avoid deadlock. The selected combination of turns per Virtual Channel allows multiple minimal path between injection point and destination point see FIG. 1. Implementing routing scheme with minimal path and with multiple routing options is key component in the solution. It allows selecting non congested path out of the multiple paths as well as dynamically change the path of ongoing transaction.

FIG. 1 illustrates an example of an integrated circuit 70 that includes a network on chip (NOC) 71. The NOC 71 includes a group of routers 72 in communication with physical channels 74, and a group of processing engines (PEs) 73.

It should be noted that the decisions made in relation to the selection of PEs and any other routing decision may be responsive to targets located outside the NOC. While various examples refer to a target PE of a NOC and to a target router of the NOC—that the targets may be located outside the NOC—and even at another integrated circuit. While FIGS. 1-3 illustrate only a NOC—it should be noted that edge routers (routers that have connections to entities outside the NOC) may be connected to one or more external targets, and that the selection of routing channels and direction of propagation within the NOC and a direction of propagation towards a target outside the NOC and in communication with an edge router of the NOC may impact the source PE decisions.

Figure 2:
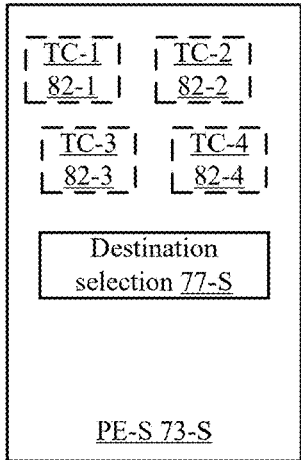
FIG. 2 illustrates an example of an integrated circuit, a NOC, a source processing engine, a source router, and destination processing engine candidates.
Figure 3:
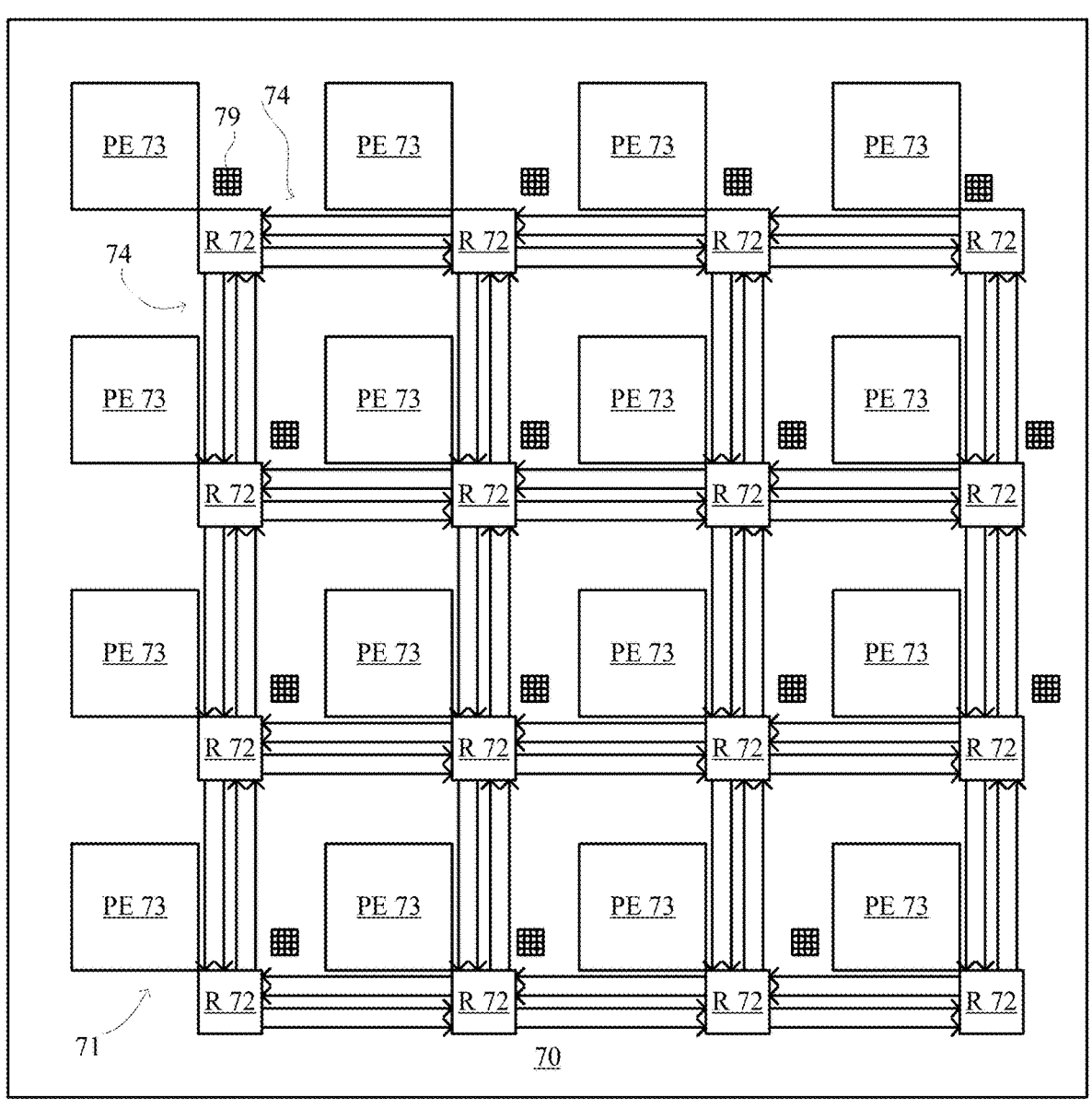
FIG. 3 illustrates an example of an integrated circuit, a NOC and maps.

It should be noted that any router 72 of FIGS. 1-3 may include multiple routing elements—each allocated to manage some of the channels managed by router 72. FIG. 5 illustrate a router 72 that includes four routing elements 72'. There may be two or any other of routing elements per router R 72. Different routing elements—and different physical channels may form different physical networks that form the NOC. Alternatively—a single routing element may be configured to route a packet between one physical network to another. For example—referring to FIG. 1—which illustrates four physical networks between a pair of adjacent routers-whereas a half of the physical channels may belong to a first physical network and the other half of the physical channels may belong to a second physical network.

In FIG. 1 the source PE is denoted PE-S 73-S, the source router is denoted R-S 72-S, physical channels 74-S-1, 74-S-2, 74-S-3 and 74-S-4 extend from source router 72-S towards a sub-group of routers denoted R-I1 72-11 and R-I2 72-12. The source PE 73-S includes a NOC transaction generator 76-S and a router selection 75-S that is configured to select a physical channel (out of physical channels 74-S-1, 74-S-2, 74-S-3 and 74-S-4) based on backpressure information (BP-1 81-1, BP-2 81-2, BP-3 81-3 and BP-4 81-4) associated with the four physical channels.

FIG. 1 also illustrated three minimal distance routes 75-1, 75-2 and 75-3 from source router 72-S to destination router 72-D. For simplicity of explanation the routes passed over some of the relevant physical channels.

In addition to minimal distance multiple path the implementation use multiple Physical Channels were every source PE and destination PE are connected by multiple PCs, allowing selection of less congested channels.

Congestion Prediction and Identification.

Traffic over NOC is not planned and can dynamically change. Few methods for congestion prediction and identification are presented in this solution.

Injection point measurement. At the injection point the implementation use the following measurements to estimate channel congestion. The measurements are done per channel and per direction.

a. Injection delay from PE to NOC or back pressure from NOC to PE with running moving average. The moving average maintains some history of latest transaction. The back pressure measurement was found more efficient compared to PC traffic measurement as it reflects no backpressure if the PE didn't try to inject traffic for a while. Decisions based on back pressure measurement reflects the source contribution to the congestion and therefore improve fairness.
    b. Credits availability toward next router. When credit availability is low there is risk for immediate backpressure and head of line blocking. Tracking available credits with running moving average per channel and per direction reflects the PC load At the injection point the measurements above are used to grade the congestion and the availability per channel per direction. This grade is used for decision per injected transaction that selects optimal channel and direction.

See, for example. FIG. 3 that is an example of injection point measurements and especially of back pressure from each physical channel (PC) and available credit per PC per direction.

Router Per Direction Measurement

In the router there are ongoing measurements to trace load and congestion, measurements are per channel and per direction. This information is used for dynamically changing the rout of transaction based on congestion.

The congestion measurement has two components:

a. Long term measurement done as running moving average on available credits toward next NOC router. Running average is used to estimate congestion with some history. The history window refers to few cycles which is relevant for next two or three NOC routers. The history of available credits reflects congestion further into the next routers. Yet for another example— an 'enable' of the moving average is '1', and the 'data' of the moving average (pending request and successful transmission), meaning the local port of the router has pending request that would like to go to the direction but cannot win because there is no credit. In such case the value is 1 (or 1.0000 for fraction accuracy). In all other cases the value is 0 (for 0.0000 accuracy). The resulting average is a fraction between 0.0000 to 1.0000. In binary representation we can take the upper digits (0.00-1.00) as a congestion metrics—or color.

b. Immediate congestion. The immediate congestion may be related to connectivity between a cross-bar of the PE and its related router. There may be multiple (so called "local") physical channels between a PE and its related router-see for example local physical channels 76-1 and 76-2 of FIG. 5—between crossbar 73-1 of PE 73 and router 72. The PE may tend not to select a local physical channel that is congested-according to its backpressure. Different local physical channels may be associated with different physical paths between routers and/or with different physical networks. Not pass through low credit next hop—especially the closest hop to the injection point. The cross-bar is also in communication with multiple clients 73-2 till 73-N of the PE. A client may be a processor, a memory bank, or any circuit that may receive or transmit a packet.

Destination PE Congestion Measurement

Endpoint congestion is measured based on two different congestion types:

a. PC (physical channel) congestion measured based on the back pressure from PE to NOC for specific PC. This can occur due multiple access over the specific PC into the specific PE. Access can be of different VC and different target within the PE.

b. PE target congestion measurement this congestion is built due to multiple transactions over different PC to the same target (even a target external to the NOC) within the PE, for example specific acceleration engine. The measurement is based on Back pressure from the PE target toward the input PC.

The solution may treat endpoint congestion to a target located outside the NOC, to multiple edge routers. The goal is to load balance the NOC exit points where the routing function tries to exit the NOC in perpendicular direction (which is more efficient than routing to the edge row or column and turning there to the exit point). The selection of mesh exit channel may be based on exit congestion and exit buffer availability, and is communicated out of band to all processing elements. When the target of a message is one that has multiple mesh exist points (meaning multiple edge routers can be used to send the message to that target), the portion of the map which measures congestion at those edge points it used to select the edge router, then the perpendicular mesh exit used to select initial route direction, and finally the local congestion among PCs in that direction is used to select the PC. The edge routers may be regarded as destination router candidates.

FIG. 2 illustrates an example of a source router R-S 72-S and a source PE denoted PE-S 73-S and four destination PE candidates RC-1 72-1, RC-2 72-2, RC-3 72-3, and RC-4 72-4.

The source PE 73-S includes a destination selection unit 77-S that is configured to select a destination PE out of four destination PE candidates RC-1 72-1, RC-2 72-2, RC-3 72-3, and RC-4 72-4. The selection is based, at least in part, on the destination PE candidates target congestion TC-1 82-1, TC-2 82-2, TC-3 82-3, and TC-4 82-4. Congestion buildup identification Two components in the solution are used for identifying congestion-Local identification and system wide congestion identification.

Local Identification

Local identification is based on two types of comparison:

1. Comparing the measured congestion parameters described in previous section. Compare is done per transaction between the relevant PCs and directions. For Example at the PE upon injection to NOC there are multiple relevant PCs, the comparison can identify which one is less congested and prefer it.

2. Comparing the measured parameters to configured values. If the measured parameter is above the configured value, the PC is marked as congested.

System Wide Congestion Identification

Based on dedicated signals distributing congestion information, every PE has a system wide map of congestion per destination PE. The distribution network is designed for minimal delay and maximal information. See, for example maps 79 of FIG. 3. The congestion can be measured anywhere—for example per each router and/or for each physical channel.

Congestion Avoidance and Congestion Impact Reduction

Based on the information measured, collected, and distributed to all PEs and NOC routers the following actions are taken to reduce the congestion and reduce congestion impact.

The goal of the system is to prevent congestion buildup as it will impact transactions targeting the congested destination as well as transaction bypassing in the congested area.

Transaction that target the congested PE will increase the NOC congestion so the solution prevents the injection. By doing so the NOC congestion is reduced and the congestion impact is only for activity related to the congested target.

For transaction which target non-congested PE the implementation prefers bypassing congested NOC resources.

Most congestion measurements has time notation and react slowly to changes, Examples: running average, congestion information distribution. Therefore, the decisions based on this information are taken with random component we configuration controls the probability weight. The default operation is to distribute transactions uniformly, upon congestion using probability cause preferring non congested resources but prevents selecting only non congested resources.

Injection PE when Destination PE is Congested

As mentioned previously there are two types of congestion in the destination PE, for each type different action is taken.

a. Transactions to congested destination target-specific destination machine: reduce injection rate for access to the specific destination machine.

b. Transaction that destination PE has congested PC: avoid injection to congested PC and select different PC.

Injection PE Path Selection Upon Local Congestion

Injected transaction has multiple options at the injection point:

a. PC selection b. Direction selection.

Based on the collected congestion information PC and direction are selected. Selection algorithm target preferring less congested channels yet preventing multiple selections of the same optimal PC and direction to avoid creating congestion.

The selection logic assigns probability weight for every PC and direction based on its aggregated congestion. Based on the probability weight a random selection is made where less congested equal PCs has higher equal probability to get selected compared to congested PCs that get lower probability.

On the Fly Dynamic Congestion Avoiding

For on going transactions on every router per transaction the implemented logic evaluates the best direction to progress toward the destination considering calculated congestion. At the router the selection is between up to two directions maintaining the minimal path. In this case only the selection has rand component were the probability weight is based on the congestion level. The probability is used to avoid multiple consecutive decision for consecutive transactions that will cause congestion over preferred direction.

FIG. 4 illustrates an example of method 400 for traffic control in a network on chip (NOC) that may include a group of routers and a group of processing engines (PEs).

Method 400 may start by step 410 of obtaining, by a source PE that is coupled to a sub-group of routers via a sub-group of channels, backpressure information related to sub-group of channels.

The sub-group of channels may be coupled to or connected to the source PE. Different source PEs are associated with different sub-groups of channels.

The sub-group of channels may be a sub-group of physical channels or a sub-group of virtual channels. A physical channel may support one or more virtual channels.

Any PE of the group of PEs may be a source PE. When a PE intends to send a packet over the NOC then that PE is regarded as a source IP.

Step 410 may be followed by step 420 of selecting, by the source PE, a selected channel of the sub-group of channels for conveying a packet destined to reach a destination PE. The destination PE belongs to the group of PEs and is the destination of the packet—from a point of view of the NOC. Thus—the packet may exit the NOC and reach the destination PE.

The selecting of step 420 may be based, at least in part, on the backpressure information. At least in part means that the selection may be solely based on the backpressure information or may be based on the backpressure information and additional information.

Step 420 may also include associating the packet with routing information.

The routing information may be indicative of an entire path of the packet till reaching the destination PE.

Alternatively—the routing information may be indicative of only a part of a path of the packet till reaching the destination PE. In this case one or more routers of the NOC may perform routing decisions without being provided explicit routing decisions by the source PE.

Step 420 may be followed by step 430 of outputting the packet to the selected channel.

Step 430 may be followed by step 440 of propagating the packet along the NOC till reaching the destination PE.

Step 420 may be executed during an execution cycle.

The backpressure information may include current execution cycle congestion information (also referred to as immediate congestion information) and multiple execution cycle congestion information (also referred to as long term measurement).

Step 420 may include avoiding from selecting a channel of the sub-group that may be currently congested (for example has a low credit and even zero credit) according to the current execution cycle congestion information.

The selecting of step 420 may be based at least in part on grades allocated to the sub-group of channels, wherein a value of each grade may be selected out of at least two values, wherein the grades may be included in the multiple execution cycle congestion information. Thus—the long term measurements may provide a grade (or credit) that may have more than two possible values. The number of possible values increases as the number of bits allocated to the values increases. For example three bits provide eight possible values.

Step 420 may include calculating the grades using a moving window process.

The destination PE related to the packet may be provided to the source PE. Alternatively, the destination PE may be selected out of multiple destination PE candidates.

Method 400 may include step 415 of selecting, by the source PE, the destination PE out of destination PE candidates. Step 415 may be followed by step 420.

Step 415 may be responsive to at least one out of:
a. Destination PE candidates congestion measurements. For example—selecting less congested destination PEs.
b. Load balancing and/or fairness.
c. Buffering behavior information regarding the destination PE candidates. The buffering behavior information refers to buffers that are included in the destination PE candidates or to buffers that follow the destination PE candidates—such as inter-NOC buffers or inter-IC buffers. Examples of buffers (for example—buffer or virtual buffer per physical channel (or virtual channel) are illustrated in FIG. 5—and denoted B 91.

Accordingly, during multiple iterations of method 400 (triggered by the need to output multiple packets)—different packets may be associated with different destination PEs.

Step 415 may include at least one of:
A. Performing load balancing between destination PE candidates having a same value of destination PE candidates congestion measurements.
B. Assigning probability based congestion weights to the destination PE candidates, and based on the probability based congestion weights performing a random selection of the selected destination PE.

Referring back to FIG. 1—FIG. 1 illustrates an example of an integrated circuit 70 that includes a network on chip (NOC) 71. The NOC 71 includes a group of routers 72 in communication with physical channels 74, and a group of processing engines (PEs) 73.

The integrated circuit is configured to execute method 400.

Any PE of the group of PEs may act as a source PE and may act as a destination PE. For brevity of information, in FIG. 1 a source PE is denoted 73-S and a destination PE is denoted 73-D.

Source PE 73-S is coupled to a router 72-S that in turn is in communication with a sub-group of routers via a sub-group of channels 74-S.

Source PE 73-S is configured to:
a. Obtain backpressure information related to sub-group of channels.
b. Select a selected channel of the sub-group of channels for conveying a packet destined to reach a destination PE. The selecting is based, at least in part, on the backpressure information. The source PE and the destination PE belong to the group of PEs. The sub-group of routers belong to the group of routers
c. Output the packet to the selected channel.

The selecting occurs during an execution cycle, backpressure information comprises current execution cycle congestion information and multiple execution cycle congestion information.

The source PE may be configured to select by avoiding from selecting a channel of the sub-group that may be currently congested according to the current execution cycle congestion information.

The source PE may be configured to select based at least in part on grades allocated to the sub-group of channels, wherein a value of each grade may be selected out of at least two values, grades are included in the multiple execution cycle congestion information. The grades may be backpressure grades.

The source PE may be configured to calculate the grades using a moving window process.

The source PE may be configured to select the destination PE out of destination PE candidates.

The source PE may be configured to select the destination PE in response to destination PE candidates congestion measurements.

The NOC may be configured to distribute the destination PE candidates congestion measurements between the PEs.

The source PE may be configured to select the destination PE by performing load balancing between destination PE candidates having a same value of destination PE candidates congestion measurements.

The source PE may be configured to select the destination PE by assigning probability based congestion weights to the destination PE candidates, and based on the probability based congestion weights performing a random selection of the selected destination PE.

The source PE may be configured to select the destination PE by also based on buffering behavior information regarding the destination PE candidates.

The source PE may be configured to associate the packet with routing information. The routing information may be indicative of an entire path of the packet till reaching the destination PE. The routing information may be indicative of only a part of a path of the packet till reaching the destination PE.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for traffic control in a network on chip (NOC) that comprises a group of routers and a group of processing engines (PEs), the method comprises:

obtaining, by a source PE that is coupled to a sub-group of routers via a sub-group of channels, backpressure information related to sub-group of channels;

selecting, by the source PE, a selected channel of the sub-group of channels for conveying a packet destined to reach a destination PE; wherein the selecting is based, at least in part, on the backpressure information; wherein the source PE and the destination PE belong to the group of PEs; wherein the sub-group of routers belong to the group of routers; and outputting the packet to the selected channel;

wherein the selecting occurs during an execution cycle, wherein the backpressure information comprises current execution cycle congestion information and multiple execution cycle congestion information; and wherein the selecting is based at least in part on grades allocated to the sub-group of channels, wherein a value of each grade is selected out of at least two values, wherein the grades are included in the multiple execution cycle congestion information.

2. The method according to claim 1, wherein the selecting comprises avoiding from selecting a channel of the sub-group that is currently congested according to the current execution cycle congestion information.

3. The method according to claim 1, comprising calculating the grades using a moving window process.

4. The method according to claim 1, comprising selecting, by the source PE, the destination PE out of destination PE candidates.

5. The method according to claim 4, wherein the selecting of the destination PE is responsive to destination PE candidates congestion measurements.

6. The method according to claim 5, comprising distributing the destination PE candidates congestion measurements between the PEs.

7. The method according to claim 5, wherein the selecting of the destination PE comprises performing load balancing between destination PE candidates having a same value of destination PE candidates congestion measurements.

8. The method according to claim 5, wherein the selecting of the destination PE is also based on buffering behavior information regarding the destination PE candidates.

9. The method according to claim 1, comprising associating the packet with routing information.

10. The method according to claim 9, wherein the routing information is indicative of an entire path of the packet till reaching the destination PE.

11. The method according to claim 9, wherein the routing information is indicative of only a part of a path of the packet till reaching the destination PE.

12. A method for traffic control in a network on chip (NOC) that comprises a group of routers and a group of processing engines (PEs), the method comprises:

obtaining, by a source PE that is coupled to a sub-group of routers via a sub-group of channels, backpressure information related to sub-group of channels;

selecting, by the source PE, a selected channel of the sub-group of channels for conveying a packet destined to reach a destination PE; wherein the selecting is based, at least in part, on the backpressure information; wherein the source PE and the destination PE belong to the group of PEs; wherein the sub-group of routers belong to the group of routers; and outputting the packet to the selected channel;

wherein the method further comprises selecting, by the source PE, the destination PE out of destination PE candidates; wherein the selecting of the destination PE is responsive to destination PE candidates congestion measurements and comprises assigning probability based congestion weights to the destination PE candidates, and based on the probability based congestion weights performing a random selection of the selected destination PE.

13. A integrated circuit that comprises:

a network on chip (NOC);

wherein the network on chip comprises a group of routers and a group of processing engines (PEs);

wherein the group of PEs comprise a source PE that is coupled to a sub-group of routers via a sub-group of channels;

wherein the source PE is configured to:

obtain backpressure information related to sub-group of channels;

select a selected channel of the sub-group of channels for conveying a packet destined to reach a destination PE; wherein the selecting is based, at least in part, on the backpressure information; wherein the source PE and the destination PE belong to the group of PEs; wherein the sub-group of routers belong to the group of routers; and output the packet to the selected channel;

wherein the selecting occurs during an execution cycle, wherein the backpressure information comprises current execution cycle congestion information and multiple execution cycle congestion information; and wherein the source PE is configured to select based at least in part on grades allocated to the sub-group of channels, wherein a value of each grade is selected out of at least two values, wherein the grades are included in the multiple execution cycle congestion information.

14. The integrated circuit according to claim 13, wherein the source PE is configured to select by avoiding from selecting a channel of the sub-group that is currently congested according to the current execution cycle congestion information.

15. The integrated circuit according to claim 13, wherein the source PE is configured to select calculate the grades using a moving window process.

16. The integrated circuit according to claim 13, wherein the source PE is configured to select the destination PE out of destination PE candidates.

17. The integrated circuit according to claim 16, wherein the source PE is configured to select the destination PE in response to destination PE candidates congestion measurements.

18. The integrated circuit according to claim 17, wherein the NOC is configured to distribute the destination PE candidates congestion measurements between the PEs.

19. The integrated circuit according to claim 17, wherein the source PE is configured to select the destination PE by performing load balancing between destination PE candidates having a same value of destination PE candidates congestion measurements.

20. The integrated circuit according to claim 17, wherein the source PE is configured to select the destination PE by also based on buffering behavior information regarding the destination PE candidates.

21. The integrated circuit according to claim 13, wherein the source PE is configured to associate the packet with routing information.

22. The integrated circuit according to claim 21, wherein the routing information is indicative of an entire path of the packet till reaching the destination PE.

23. The integrated circuit according to claim 21, wherein the routing information is indicative of only a part of a path of the packet till reaching the destination PE.

24. A integrated circuit that comprises:

a network on chip (NOC);

wherein the network on chip comprises a group of routers and a group of processing engines (PEs);

wherein the group of PEs comprise a source PE that is coupled to a sub-group of routers via a sub-group of channels;

wherein the source PE is configured to:

obtain backpressure information related to sub-group of channels;

select a selected channel of the sub-group of channels for conveying a packet destined to reach a destination PE;

wherein the selecting is based, at least in part, on the backpressure information; wherein the source PE and the destination PE belong to the group of PEs; wherein the sub-group of routers belong to the group of routers; and output the packet to the selected channel; wherein the source PE is configured to select the destination PE out of destination PE candidates, in response to destination PE candidates congestion measurements and by assigning probability based congestion weights to the destination PE candidates, and based on the probability based congestion weights performing a random selection of the selected destination PE.

25. A non-transitory computer readable medium that stores instructions that once executed by a source processing engine (PE) causes the source processing engine to execute the steps of:

obtaining, by the source PE that is coupled to a sub-group of routers via a sub-group of channels, backpressure information related to sub-group of channels; wherein the source PE belongs to a network on chip (NOC) that comprises a group of routers and a group of processing engines (PEs), the group of routers comprises the sub-group of routers;

selecting, by the source PE, a selected channel of the sub-group of channels for conveying a packet destined to reach a destination PE; wherein the selecting is based, at least in part, on the backpressure information; wherein the source PE and the destination PE belong to the group of PEs; wherein the sub-group of routers belong to the group of routers; and outputting the packet to the selected channel; wherein the selecting occurs during an execution cycle, wherein the backpressure information comprises current execution cycle congestion information and multiple execution cycle congestion information; and wherein the selecting is based at least in part on grades allocated to the sub-group of channels, wherein a value of each grade is selected out of at least two values, wherein the grades are included in the multiple execution cycle congestion information.

\*    \*    \*    \*    \*